Nov. 27, 1934.  A. H. SCHAFFERT ET AL  1,982,269
SASH OPERATING MECHANISM
Filed April 20, 1931   6 Sheets-Sheet 1

Inventors
Adolf H. Schaffert
Harold E. Van Voorhees,
By
Attorney

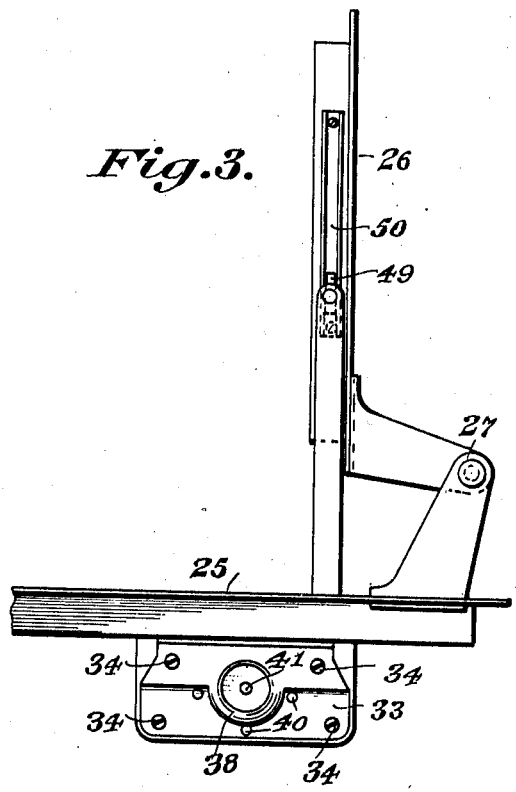
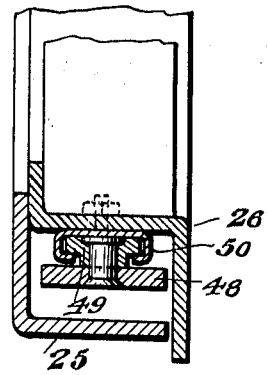
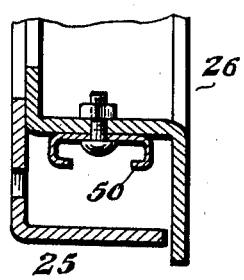
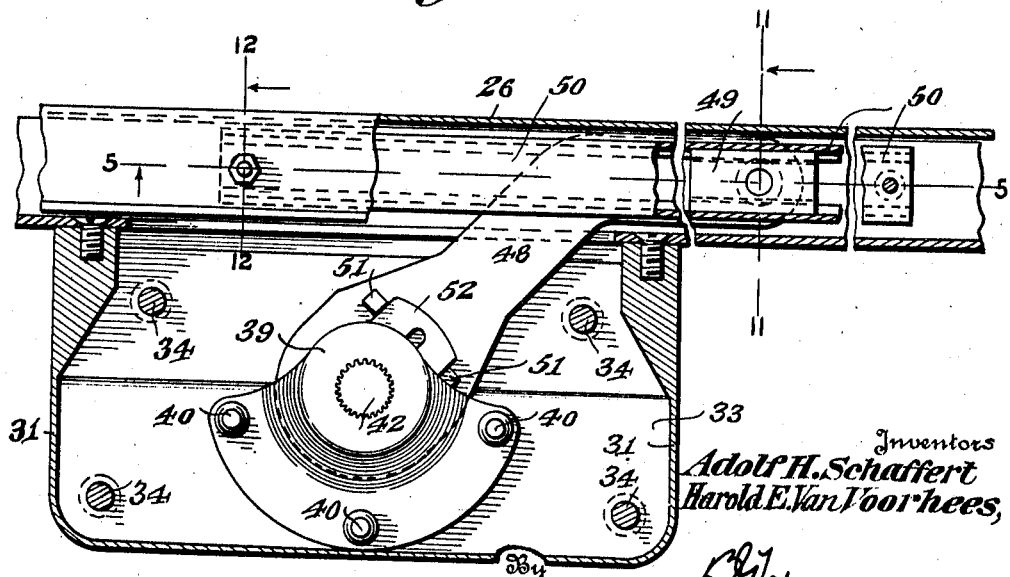

Nov. 27, 1934.  A. H. SCHAFFERT ET AL  1,982,269
SASH OPERATING MECHANISM
Filed April 20, 1931    6 Sheets-Sheet 3
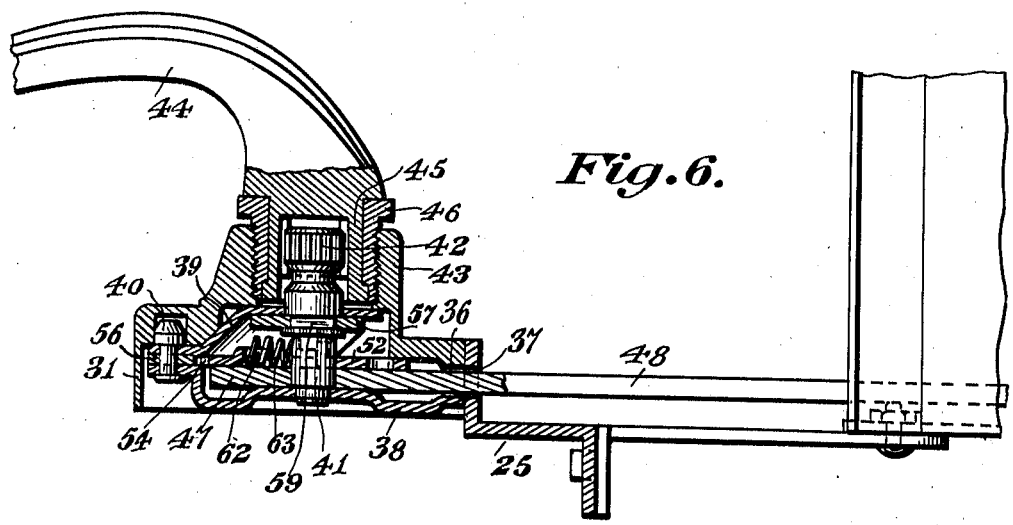
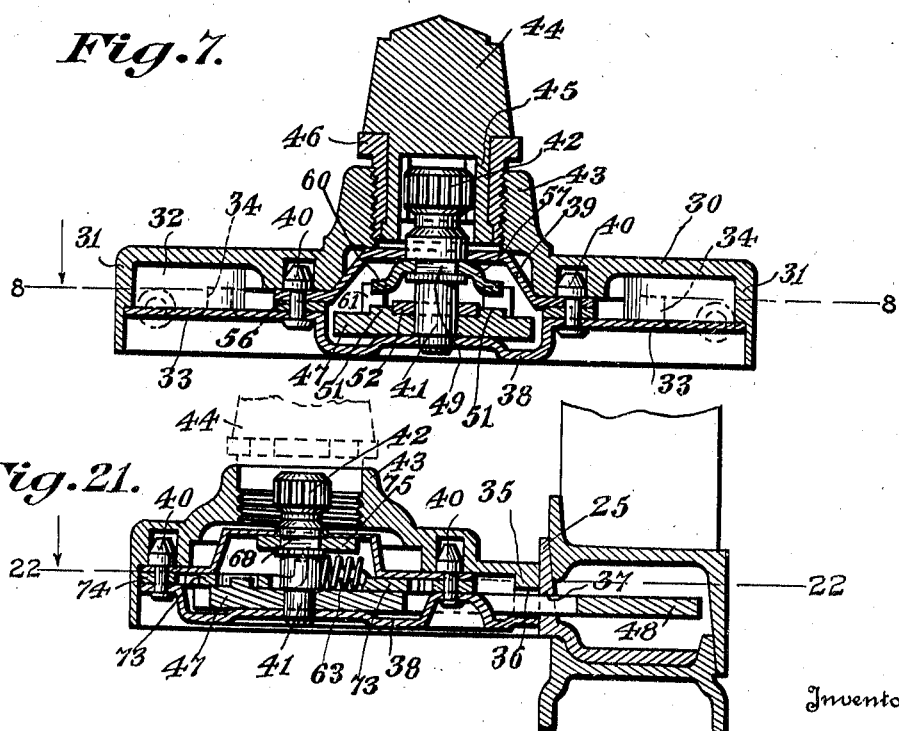
Inventors
Adolf H. Schaffert
Harold E. Van Voorhees,
By
Attorney Nov. 27, 1934. A. H. SCHAFFERT ET AL 1,982,269
SASH OPERATING MECHANISM
Filed April 20, 1931 6 Sheets-Sheet 4

Inventors
Adolf H. Schaffert
Harold E. Van Voorhees,
By
Attorney

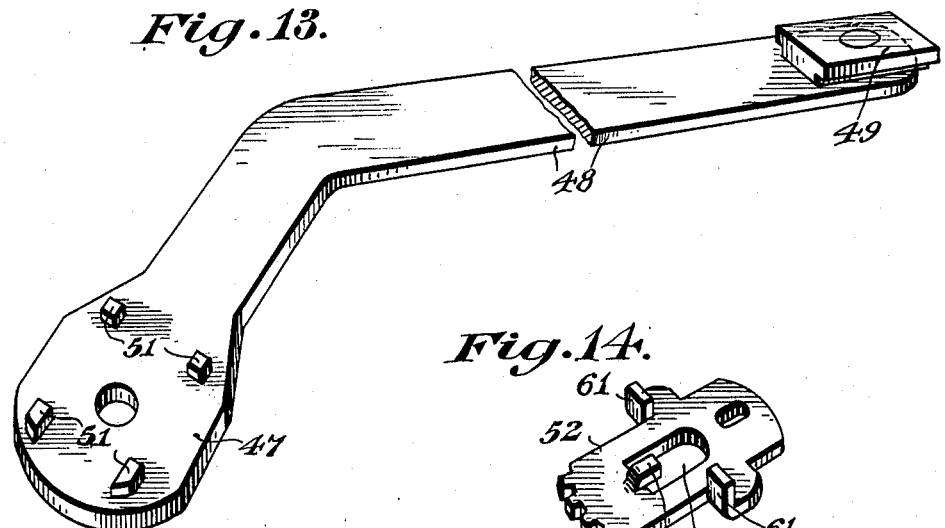
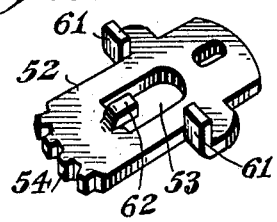
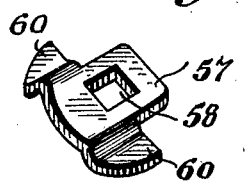
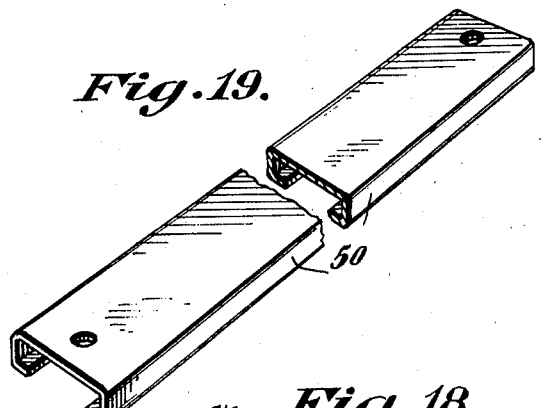
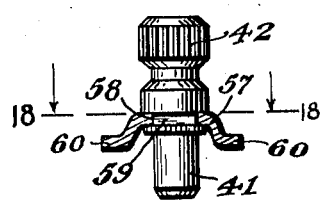
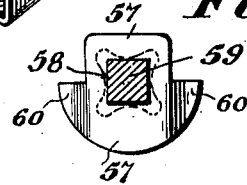
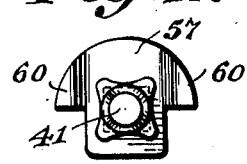

Patented Nov. 27, 1934

1,982,269

UNITED STATES PATENT OFFICE 1,982,269

SASH OPERATING MECHANISM

Adolf H. Schaffert, Youngstown, Ohio, and Harold E. Van Voorhees, Detroit, Mich., assignors to Truscon Steel Company, Youngstown, Ohio, a corporation of Michigan Application April 20, 1931, Serial No. 531,524

3 Claims. (Cl. 268—117)

In the modern type of window structures in which an outwardly swinging or otherwise moving sash is employed, it has been a problem to provide satisfactory sash operating means where a fixed screen is utilized for covering the window opening. A movable screen giving access to the sash is awkward and undesirable, particularly in an emergency as a sudden rain, and besides when opened it allows the entrance of insects that are at that particular time seeking refuge. It has also been proposed to have an operating device extending through the frame with a separate locking element. These, however, have not proven entirely satisfactory, as it requires the use of both hands to effect an adjustment of the sash, and the holding means has not always proven effective, so that windows thus equipped have slammed shut with sufficient force to shatter the glass.

The object of the present invention is to provide a simple and effective operating and locking means for an outwardly moving sash or the like, which is operable with one hand to unlock the sash, adjust it to any desired position, and re-lock it so that it will be securely held against any unintended movement.

A further and important object is to provide a structure of this kind that is compact, readily accessible and requires no particular knowledge or foresight in order to effect its actuation.

In the accompanying drawings:

Figure 3 is a bottom plan view of the structure shown in Figures 1 and 2.

Figure 4 is a horizontal sectional view on an enlarged scale through the casing and portions of the frame and sash.

Figure 1:
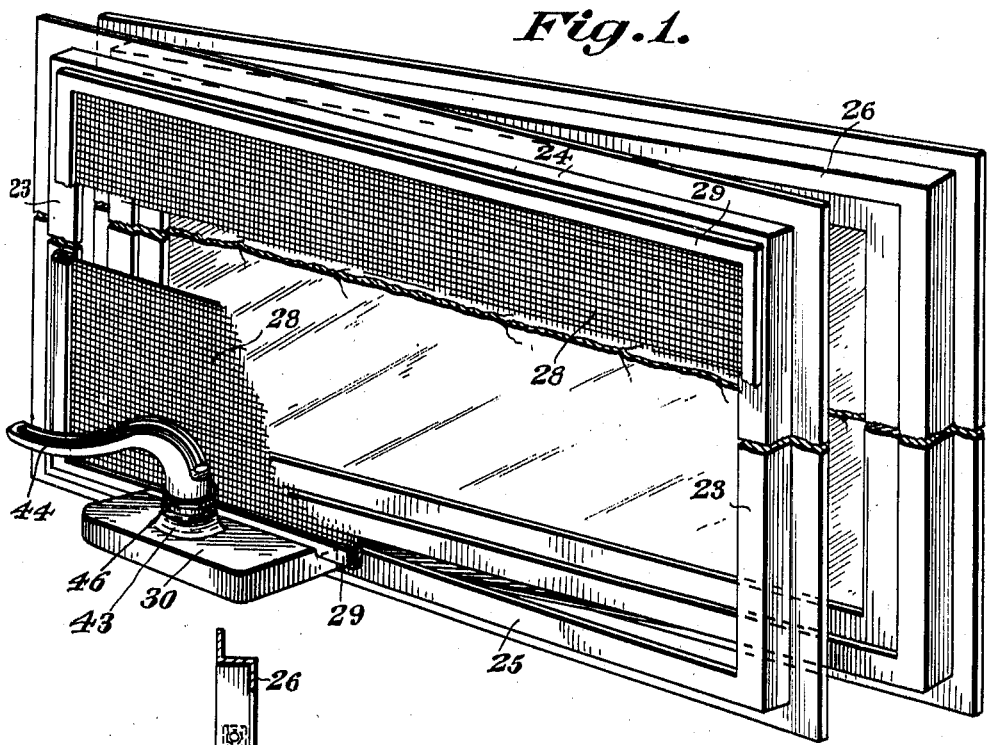
Figure 1 is a perspective view of a metal window-frame, outwardly swinging sash, and fixed screen, with the operating and locking means for the sash in place on the frame, parts being broken away.
Figures 2, 5:
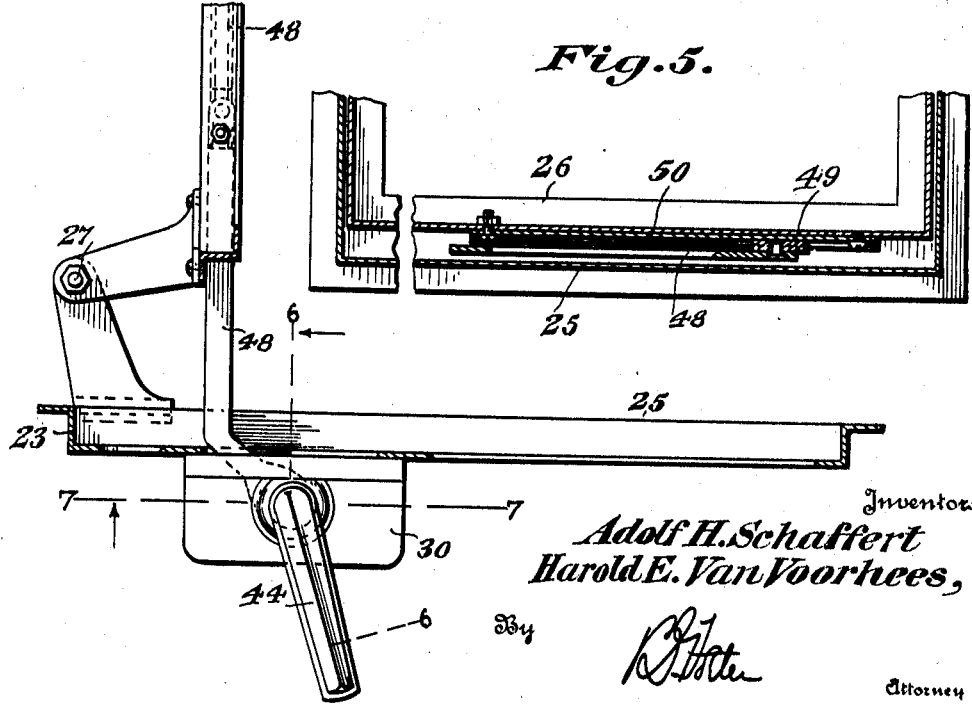
Figure 2 is a plan view of the same, with the frame and sash in horizontal section.
Figure 5 is a sectional view on the line 5—5 of Figure 4.

Figures 6 and 7 are detail sectional views taken respectively on the lines 6—6 and 7—7 of Figure 2.

Figure 8:
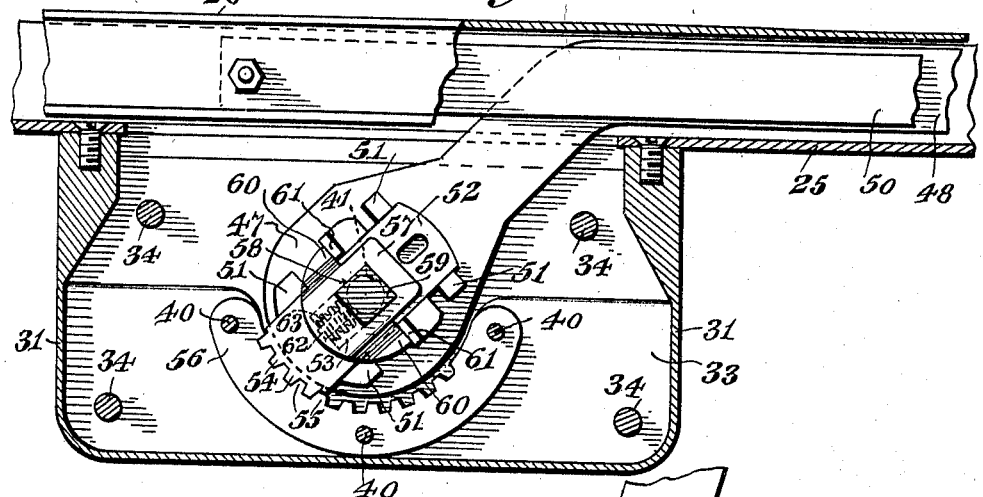

Figure 8 is a sectional view on the line 8—8 of Figure 7.

Figure 9:
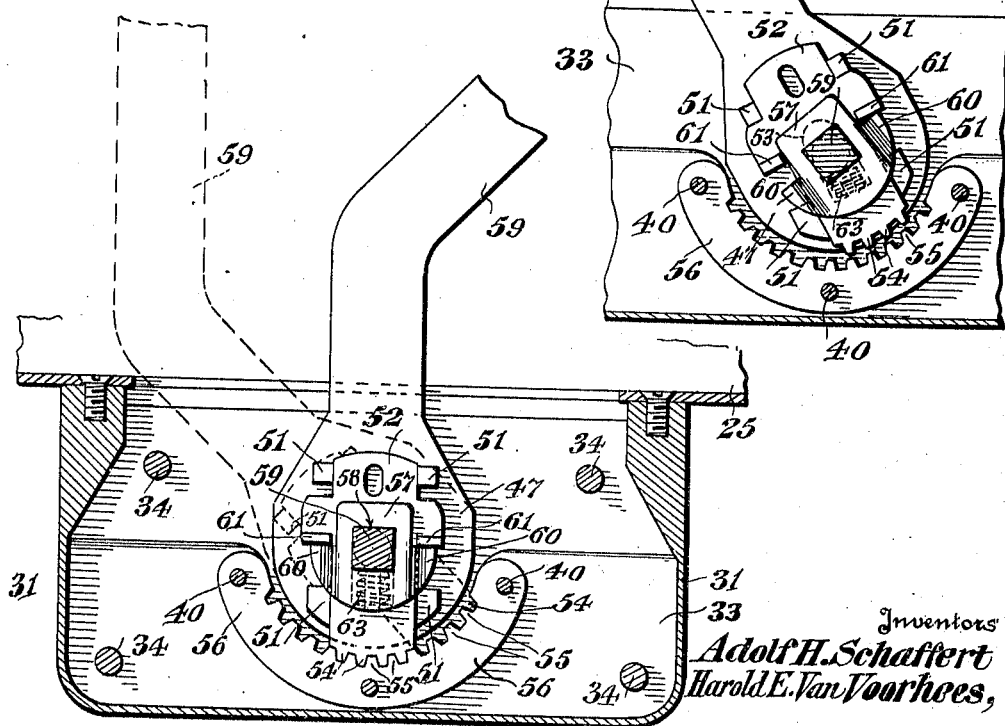

Figure 9 is a view similar to Figure 8, but showing the relation of the parts with the sash partly open.

Figure 10:
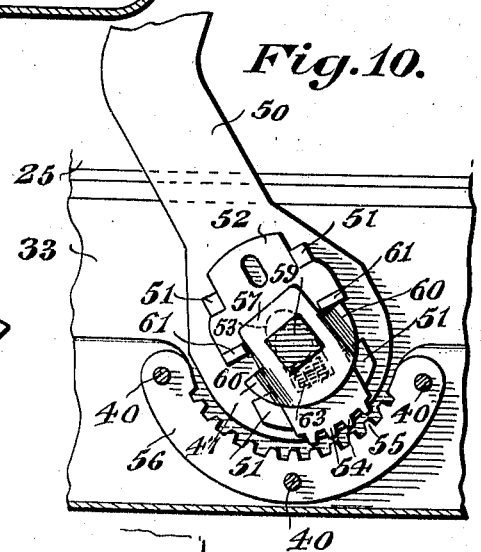

Figure 10 is another view illustrating the relation of the parts when the sash is substantially wide open and unlocked.

Figures 11 and 12 are sectional views respectively on the lines 11—11 and 12—12 of Figure 4.

Figure 13 is a detail perspective view of the sash-moving arm or link.

Figure 14 is a similar view of the locking dog.

Figure 15 is a perspective view of the link element.

Figure 16 is a side elevation of the actuating shaft with the cam element in section.

Figure 17 is a bottom plan view of the same.

Figure 18 is a sectional view on the line 18—18 of Figure 16.

Figure 19 is a perspective view of the track on the sash.

Figure 20:
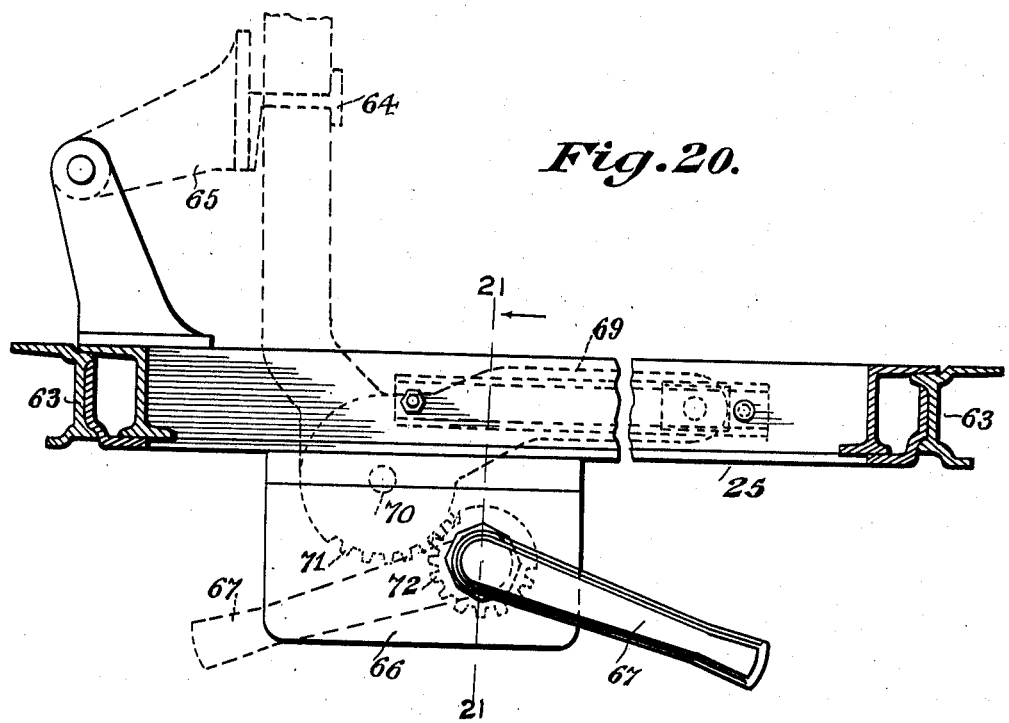

Figure 20 is a plan view of a modified form of construction.

Figure 21 is a vertical sectional view on the line 21—21 of Figure 20.

Figure 22:
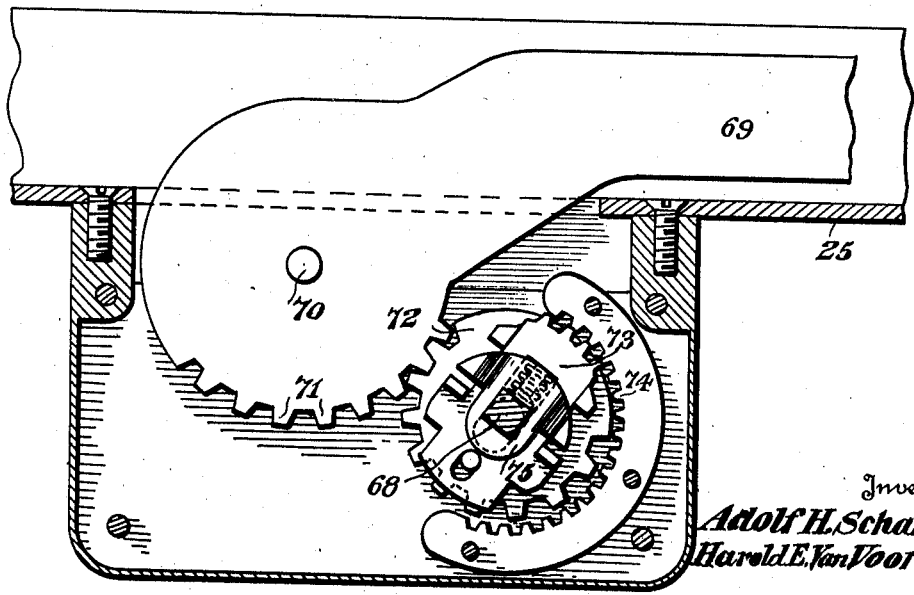

Figure 22 is a horizontal sectional view taken on the line 22—22 of Figure 21.

In the embodiment disclosed, a window frame is provided, including vertical side bars 23, a top rail 24, and a bottom rail 25. These are shown as of formed metal. An outwardly swinging sash 26, also of formed metal, is hinged, as shown at 27, to one of the side bars 23 of the frame. A screen 28 covers the window opening, and includes a frame 29 suitably fixed to the window frame 23—25. For the purpose of actuating the sash 26 and locking it in various positions in which it is placed without disturbing the screen 28—29, the following mechanism is employed. Secured to the inner side of the lower rail 25 of the window-frame, is a casing preferably consisting of a cast or otherwise formed body, having a top 30 and depending side walls 31 forming a chamber 32. A removable bottom wall 33 fits within the body, and is secured by suitable screws 34. The outer side wall of the body, shown at 35, abuts and is suitably secured to the frame rail 25, and is provided with a slot 36 in line with a longitudinal slot 37 formed in said rail 25.

In the structure shown, the bottom 33 carries the major portion of the mechanism, which can be permanently assembled on said bottom and placed within the body of the casing. To this end the central portion of the bottom is depressed, as shown at 38, and a yoke 39 is bridged over this depressed portion and is secured by suitable rivets 40. Journaled in this yoke is a vertical actuating shaft 41 having an upstanding longitudinally grooved head 42 that is located in a socket formed in an upstanding hub 43 of the casing body. A hand crank 44 is provided with a socketed portion 45 that receives the head 42 and has its walls interlocked therewith so that the turning of the hand crank 44 effects a corresponding turning movement of the shaft 41 in a manner well understood. The hand crank is rotatably mounted in a screw plug 46 threaded into the hub 43.

Loosely mounted on the lower portion of the shaft 41 is the head 47 of a link or arm 48, which extends through the slots 36 and 37, and carries at its outer end a pivoted slider block 49 that is adapted to reciprocate in a guideway or track 50 secured to the underside of the bottom rail of the sash 26, said track being formed, as shown in Figure 19, to allow the sliding movement of the block 49 and prevent its displacement therefrom. The head 47 of the arm 48, as shown in detail in Figure 13, is provided with sets of upstanding lugs 51 on opposite sides of its pivot axis, and these lugs constitute a guideway for a reciprocatory locking dog 52 having a slot 53 through which the shaft 41 passes. The locking dog extends beyond the rear side of the head 47 and its projecting portion is provided with a set of teeth 54. These teeth are adapted to move into and out of interlocking engagement with the teeth 55 of a curved rack 56 secured to the bottom wall 47 and extending around the shaft 41 (see Figures 8 and 9). It will be noted that the shaft can rotate in and with respect to the head 47 and the locking dog 52. The amount of this relative rotation is, however, limited.

A cam element 57, having an angular opening 58, receives an angular portion 59 of the shaft 41 (see Figures 15-18), and consequently the cam element is fixed to always rotate with the shaft. This cam element has outstanding actuating ears 60 which bear against abutment lugs 61, upset on the locking dog 52. This locking dog furthermore has an upset holding lug 62 that engages one end of a coiled spring 63 that serves to urge the dog in a direction to cause the teeth 54 to engage in the interdental spaces of the rack 56.

The structure, having been explained, it is believed that its operation can now be made clear. When the parts are assembled, as shown, if the sash 26 is in its closed position, the handle 44 preferably lies substantially parallel to the frame and screen. To open the window it is only necessary to grasp the handle and swing it in this instance to the right. Upon its initial movement and the corresponding initial movement of the shaft 41, the arm 48 remains idle, but the cam 57 moves to cause one of the ears 60 to bear against the adjacent lug 61 of the locking dog 52, and moving the same against the action of the spring 63, withdraws the teeth 54 from the rack 56. The parts are thus automatically unlocked and on a further movement of the handle 44 and shaft 41 with the cam 57, the rotary motion will be transmitted through the dog 52 to the arm, since the dog must turn with the arm. The swinging of the arm obviously causes the slider block 49 to move toward the hinged side of the sash 26 and effects the outward swinging movement of said sash. Whenever the handle is released, the spring 63 reacts to cause the dog 52 to interlock with the rack 56 and positively lock the parts against unintended movement, so that the sash can be moved to substantially any position between a closed and a wide open location and secured. A reverse movement on the part of the handle effects an unlocking and a closing movement of the sash. All therefore is accomplished with one hand and without the necessity of separately unlocking any parts.

In Figures 20, 21 and 22, there is shown a modification, particularly intended for larger windows where greater power can be applied. In this embodiment, it will be understood that the frame, here designated 63, the sash 64, and the hinge mounting 65 for the latter, may be the same as that already described. The casing is shown at 66 and the handle 67 is mounted on a shaft 68 journaled in the casing, all as aforesaid. Instead of the arm here designated 69, being mounted directly on the shaft 68, it is separately journaled, as shown at 70, but is connected to the sash in a manner already explained. The pivoted end of this arm has a gear segment 71 meshing with a gear 72 mounted on the shaft 68 and carrying the locking dog 73 in the manner that the dog 52 is mounted on the head 47 in the first described structure. This dog 73 interlocks with an arcuate rack 74 and is actuated by a cam element 75 corresponding in all respects to the cam element 57 of the first structure.

It will be obvious that in this embodiment the handle 67 has a greater range of movement, and the gear 72 being relatively small and acting on what is in effect a larger gear 74 on the arm 69, secures a more powerful movement on the part of the arm 69. The same general operation is, however, secured as in the first embodiment and it is believed therefore needs no further exposition.

From the foregoing, it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What we claim, is:

1. In combination, a frame, a sash hinged to the frame, a casing, a shaft in the casing, an arm mounted on the shaft and projecting from the casing, said arm having its projected portion connected to the sash, an actuating hand crank on the shaft, a dog slidable on the arm and engaged therewith to rotate it, a holding rack that is engaged by the dog, and a cam element on the shaft to move the dog both out of coaction with the rack and in a rotary direction with the shaft.

2. In combination, a frame, a sash hinged to the frame, a casing, a shaft in the casing, a gear mounted on the shaft, an arm having a gear engaged with the first gear, said arm projecting from the casing and being connected to the sash, an actuating hand crank on the shaft, a dog slidable on the first gear and engaged therewith to rotate it, a holding rack that is engaged by the dog, and a cam element on the shaft to move the dog both out of coaction with the rack and in a rotary direction with the shaft.

3. In combination with a frame, an outwardly swinging sash on the outer side of the frame, a casing mounted on the inner side of the frame, a shaft journaled in the casing and having an exposed operating handle, a connection between the shaft and sash including a rotatable element mounted on the shaft and having a guideway, a rack extending around the shaft, a locking dog slidable in the guideway and into and out of coaction with the rack, and a cam element on the shaft that operates on the dog to slide it and also cause it to turn and thereby turn the rotatable element.

ADOLF H. SCHAFFERT.
HAROLD E. VAN VOORHEES.

CERTIFICATE OF CORRECTION.

Patent No. 1,982,269.                                                                       November 27, 1934.

ADOLF H. SCHAFFERT and HAROLD E. VAN VOORHEES.

It is hereby certified that the above numbered patent was erroneously issued to "Truscon Steel Company, of Youngstown, Ohio, a corporation of Michigan" as assignee of the entire interest in said invention, whereas said patent should have been issued jointly to Truscon Steel Company, Youngstown, Ohio, a corporation of Michigan, as assignee of said "Schaffert", and Ternstedt Manufacturing Company, Detroit, Michigan, a corporation of Michigan, as assignee of said "Van Voorhees", as shown by the records of assignments in this office; and that the said Letters Patent should be read with this correction therein that the same may conform to the record of the case in the Patent Office.

Signed and sealed this 5th day of March, A. D. 1935.

Leslie Frazer (Seal)                                                           Acting Commissioner of Patents.